J. R. STEPHENS.
CAR AXLE BEARING.
APPLICATION FILED FEB. 19, 1912.
1,197,870.
Patented Sept. 12, 1916.
2 SHEETS—SHEET 1.
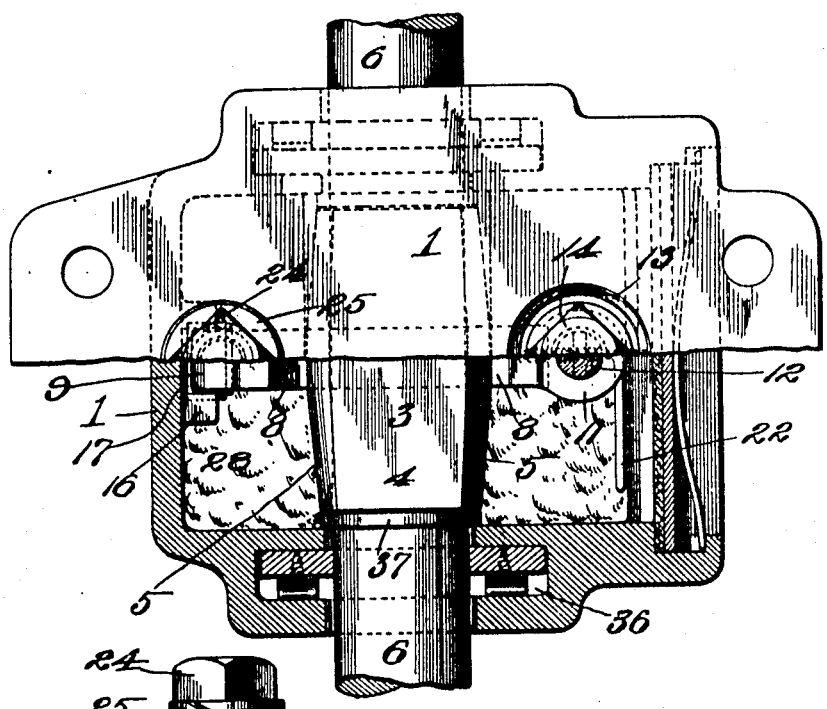
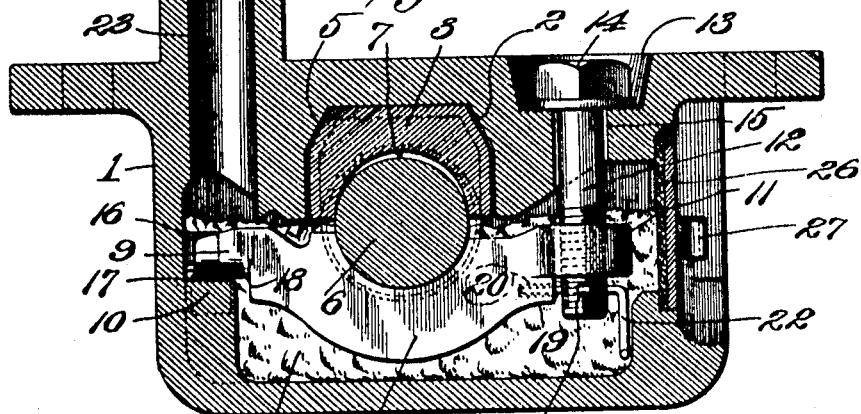
Attest:
Inventor:
John R. Stephens,
by Bruce S. Elliott
atty.

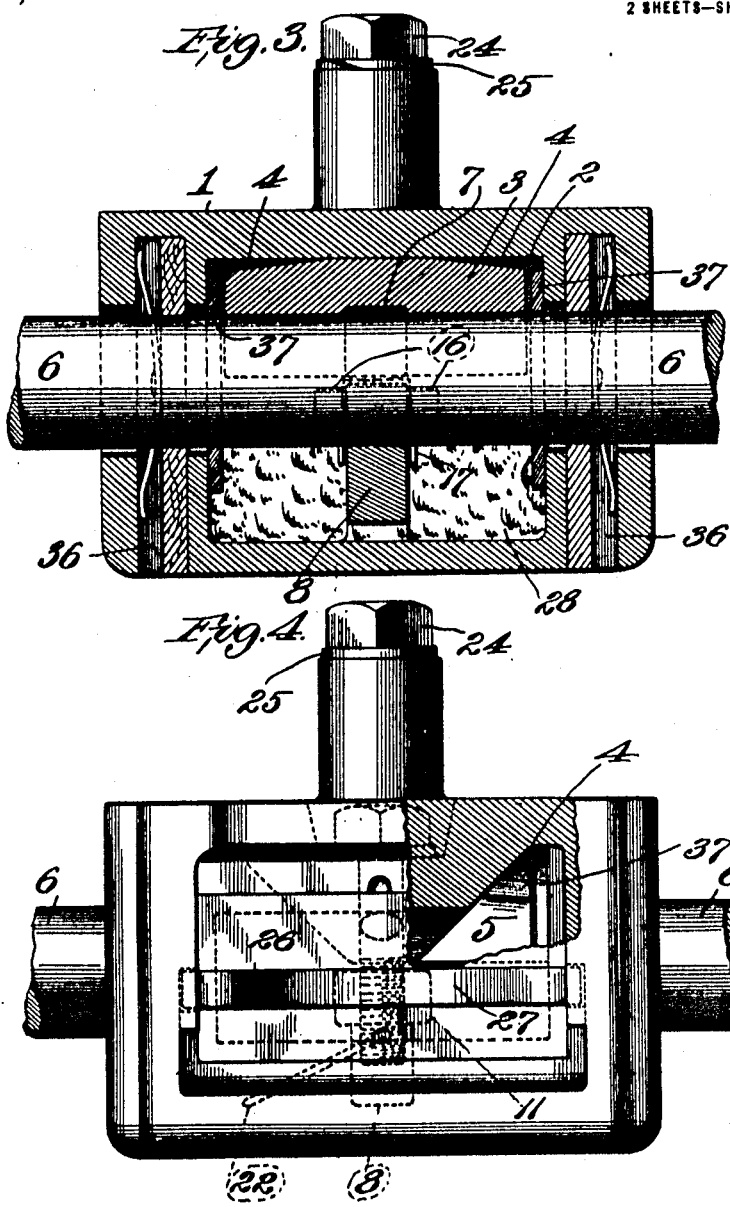

UNITED STATES PATENT OFFICE.

JOHN R. STEPHENS, OF ST. LOUIS, MISSOURI.

CAR-AXLE BEARING.

1,197,870. Specification of Letters Patent. Patented Sept. 12, 1916.

Application filed February 19, 1912. Serial No. 678,564.

*To all whom it may concern:*

Be it known that I, JOHN R. STEPHENS, a citizen of the United States, residing in the city of St. Louis and State of Missouri, have invented new and useful Improvements in Car-Axle Bearings, of which the following is a specification.

This invention relates to car axle bearings, and has for its object to provide a bearing associated with the journal box in such manner as to permit ready and automatic adjustment of the bearing to compensate for wear, or errors in workmanship destroying the accurate alinement of the parts, or for warping of the car due to inequalities, unevenness, or the like, in the rails.

A further object of the invention is to provide a car axle bearing which will permit of the same being employed with a one-piece journal-box, and which will permit of the ready insertion of waste containing oil, and the free contact of the waste with the axle throughout practically the entire lower half of the axle projecting into the journal box.

The invention resides broadly in a rocking bearing mounted in the upper portion of the journal box and a lower support, preferably quite narrow, extending at right angles to the shaft and mounted in the box in such manner as to be capable of a rocking movement independent of the movement of the upper bearing.

The invention further resides in various details of construction and combinations of parts, all of which, together with the above stated objects, will be more clearly understood from the detailed description of the invention to follow.

In a pending application, Serial Number 557,972, filed April 27th, 1910, I have described and illustrated an axle bearing involving the same general principles incident to the present construction, and in which said application I have shown two suspension bolts on which the axle support is mounted at its ends. The present application may therefore be considered as associated, in subject-matter, with the said pending application.

In the drawings—Figure 1 is a view partly in plan and partly in horizontal section of my invention; Fig. 2 is a cross section taken through the center of the journal box; Fig. 3 is a longitudinal sectional view; and Fig. 4 is a view partly in side elevation and partly in section.

Referring now to the drawings, the numeral 1 indicates the journal box or housing which, for purposes of economy, may be cast as a unitary structure. In its upper portion, on the interior, I provide a longitudinally-extending recess 2 in which is mounted a bearing block 3, said bearing block having its upper edge substantially curved, as indicated at 4, so that only its central portion will bear against the upper wall of the box, and its side portions similarly curved or tapered, as indicated at 5, so that said side portions will engage the side walls of the recess 2 only at their central portions. By this construction the bearing block is permitted in operation to oscillate in horizontal or vertical directions, the sides of the bearing block at its center being normally out of contact with the sides of the recess 2, as more clearly shown in Fig. 2, to permit of the lateral oscillating movement of the bearing block. Such movement of the bearing block 3 is a factor in enabling the bearings to automatically adjust their alinement in the operation of the car. The underside of the bearing block 3 is provided with a semicircular recess to embrace the upper half of the axle 6, and it is further provided with a central, transverse, shallow recess 7, which is preferably eccentric to the shaft and merges at its extremities into the plane of the lower inner edges of the bearing block, the purpose of this recess being to insure contact of the bearing block at its ends with the shaft, but to do away with a contact surface at the central portion of the block, which in time, as the ends of the bearing wear away more rapidly than the center portion, tends to form a pivot on which the block will rock. This arrangement secures a smooth, even contact between the bearing block and the shaft throughout their length, and prevents relative rocking movement between these parts, thereby minimizing wear, rattle and jar and prolonging the life of the bearing.

The numeral 8 indicates a narrow support which, as shown by Fig. 2, is provided with a shouldered end 9 which is supported on a ledge 10 formed on the inner side of the box, and with an enlarged end 11 provided with a screw-threaded aperture, which receives the screw-threaded end of a suspension bolt 12. The housing is provided on its upper side with a recess 13 to receive the head 14 of the bolt, and with an aperture 15 leading from said recess into the interior of the housing, said recess and aperture being larger, respectively, than the head and shank of the bolt in order to allow for a rocking movement of the bolt. The shouldered end 9 of the support 8 is rounded on its lower side to facilitate rocking and is inserted in a space between lugs 16 provided above the ledge 10, and such end may be adjusted vertically to be brought into contact with the shaft 6, and also, from time to time, to compensate for wear, by means of a shim 17, of greater or less thickness, placed on the ledge 10, and having its ends bent over the ends of said ledge, as shown, by the dotted line in Fig. 2. In this way the shim is prevented from movement laterally, and it is further prevented from working off of the ledge inwardly by means of the shoulder 18 at the end of the support. Below the enlarged screw-threaded end 11 of the support there is provided a shouldered portion 19 having a longitudinally-extending aperture 20. The lower screw-threaded end of the bolt 12 is provided with two or more cross apertures 21, and after the bolt has been turned to adjust the support 8 in contact with the shaft 6 a bent key 22 is inserted through one or the other of the apertures 21 and into the aperture 20 of the support, and its bent end turned downwardly to engage behind the front edge of the box so that it cannot work out. In this way the bolt 12 is prevented from turning in either direction to lower or raise the support 8 relative to the axle 6. The aperture 23 used for supplying oil to the waste will be closed by a short, headed bolt 24 and washer 25. The support 8, as more clearly shown by Figs. 1 and 3, is relatively narrow and is inserted through the usual opening at the front of the box which is normally closed by a dust shield 26, held by a spring 27.

In assembling the parts the bearing block 3 will, of course, be placed in the recess 2 before the journal box is placed over the axle. After this, the support 8 may be inserted into the journal box and adjusted in position. When this has been done cotton waste 28, containing oil, is then inserted through the opening referred to and it will readily be seen that a large space is provided on the interior of the box for this waste, which may have direct contact with the lower half of the axle 6 at all parts thereof except that portion resting upon the narrow support 8. This construction, providing, as just described, for the easy insertion of the waste and its intimate contact with practically the entire lower half of the axle in the journal box, I regard as a feature of great importance, as the thorough lubrication of the axle is a matter of prime necessity, and in all prior devices of which I am aware which have attempted to provide for an automatic adjustment of the bearings of the axle in the journal box, the proper lubrication of the axle is practically impossible, and under any circumstances it is a matter of exceeding difficulty to so dispose the waste in journal box of these structures as to secure its contact with the axle or to insure that it shall supply oil thereto. These difficulties are entirely overcome by the use of my construction in which the waste may be readily inserted and removed, and when in the journal box have, at all times, direct contact with the axle.

By those skilled in the art it will be readily understood that in the operation of a car containing my improved bearing the block 3 will permit of a wide range of adjustment automatically to compensate for any errors in workmanship interfering with the correct alinement of the bearing with the axle. Further, in operation, this bearing block will yield at either end upwardly or downwardly as well as laterally in either direction to compensate for any warping of the car due to crooked or uneven rails. The support 8 has primarily three functions: It supports the bearing block 3 in its recess through the medium of the shaft 6; it supports and holds the shaft 6 in its bearing at such times as the wheels of the car may be passing or stopped over a depression in the track; and, finally, it is permitted to rock, through the medium of its bearing at one end on the ledge 10, and being suspended at its other end by the bolt 12, which is capable of rocking, to preserve the correct bearing contact of the support with the axle 6 as the latter may move in one or the other direction.

The automatic adjustability of the support 8, by which it is enabled to accommodate itself to varying positions of the axle, contemplates a slight horizontal turning or swinging movement on the shouldered end 9 as a pivot, and about an imaginary vertical axis, which, in the illustration would coincide with the axial line of the oil duct 23. Such movement is permitted by reason of the loose fit of the shouldered end 9 in the space between the lugs 16, as more clearly shown in Figs. 1 and 3, allowing lateral play of such end, in conjunction with the enlarged aperture 15 surrounding the supporting bolt 12. As both ends of the support 8 are free to move a limited distance in a horizontal plane, it may likewise occur that the axis of movement on occasion will be transferred to the center of the support, and be coincident with a vertical line passing centrally through the axle. The provision for a horizontal turning movement of the support 8 as described, enables it to readily accommodate itself to horizontal twists of the axle. The various positions which may thus be assumed by the bearing block 3 and the support 8, insure that the bearing, as a whole, will adjust itself to any conceivable position which may be assumed by the axle in the operation of the car. The usual spring-pressed dust guards 36 are provided in opposite ends of the box, and preferably I will insert brass bearing rings 37 between the ends of the bearing block 3 and the corresponding end of the journal box.

A further advantage incident to my construction resides in the fact that by having a narrow rocking or swinging support mounted in the journal box and surrounded by waste containing lubricating oil, the lubrication of the axle is greatly facilitated, inasmuch as in its lateral movement alternately in opposite directions the support compresses the waste in each movement and forces the lubricant upward on the axle.

I claim:

1. In combination with a car axle box, an upper bearing block for the axle mounted therein, an independent, relatively narrow stirrup supporting said axle and having one end supported on a fixed part of the box, and a suspension bolt loosely mounted in the box and supporting the opposite end of said stirrup.

2. In combination with a car axle box, an upper bearing block for the axle mounted therein, an independent, relatively narrow stirrup supporting said axle and having one end supported on a fixed part of the box, a suspension bolt loosely mounted in the box and supporting the opposite end of said stirrup, and means for locking said bolt against rotation.

In testimony whereof, I have hereunto set my hand in presence of two subscribing witnesses.

JOHN R. STEPHENS.

Witnesses:
BRUCE S. ELLIOTT,
STELLA HILL.

Copies of this patent may be obtained for five cents each, by addressing the "Commissioner of Patents, Washington, D. C."